US 11,564,007 B1

United States Patent
Agrawal et al.

(10) Patent No.: US 11,564,007 B1
(45) Date of Patent: Jan. 24, 2023

(54) ELECTRONIC DEVICE THAT PRESENTS MEDIA CONTENT ON DISPLAY BASED ON CONSUMER CONTEXT

(71) Applicant: MOTOROLA MOBILITY LLC, Wilmington, DE (US)

(72) Inventors: Amit Kumar Agrawal, Bangalore (IN); Mayank Gupta, Naperville, IL (US); Nadeen Nazarali Panjwani, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/410,332

(22) Filed: Aug. 24, 2021

(51) Int. Cl.
*H04N 21/442* (2011.01)
*H04N 21/422* (2011.01)
*G06V 40/16* (2022.01)
*H04W 4/02* (2018.01)

(52) U.S. Cl.
CPC ..... *H04N 21/44218* (2013.01); *G06V 40/161* (2022.01); *G06V 40/172* (2022.01); *H04N 21/42201* (2013.01); *H04N 21/42203* (2013.01); *H04W 4/025* (2013.01)

(58) Field of Classification Search
None
See application file for complete search history.

(56) References Cited

U.S. PATENT DOCUMENTS 9,210,313 B1 * 12/2015 Svendsen ............. H04N 9/8715
11,166,075 B1 * 11/2021 Decrop ............. H04N 21/4532
2005/0105806 A1 * 5/2005 Nagaoka ............. G06V 20/30
  348/231.2
2006/0204034 A1 * 9/2006 Steinberg ............. G06V 10/10
  382/118
2009/0133051 A1 * 5/2009 Hildreth ........... H04N 21/42204
  725/28
2009/0185033 A1 * 7/2009 Nozaki ............ H04N 21/42204
  348/E7.085
2009/0318194 A1 * 12/2009 Alberth, Jr ........ H04M 1/27475
  455/566
2011/0069085 A1 * 3/2011 Weber ..................... G06T 11/60
  345/620
2011/0072452 A1 * 3/2011 Shimy .............. H04N 21/44218
  725/25
2011/0309946 A1 * 12/2011 Jonsson ............ H04M 1/72448
  340/686.6

(Continued)

*Primary Examiner* — Alexander Q Huerta
(74) *Attorney, Agent, or Firm* — Isidore PLLC

(57) ABSTRACT

An electronic device, computer program product, and method enable selection and presentation of media content associated with a person identified in a monitored space. The electronic device includes a device interface that is communicatively coupled to a media output device that presents media content in the monitored area. A controller of the electronic device is communicatively coupled to sensor(s) and the media output device. The controller presents a default selection of media content on the media output device. The controller monitors the sensor(s) to detect a presence of a person within or approaching the monitored area. The controller identifies the person. The controller selects, from among a plurality of available media content, media content that is associated with the identified person. The controller presents the selected media content on the media output device.

20 Claims, 5 Drawing Sheets

(56) References Cited

U.S. PATENT DOCUMENTS

| | | | |
|---|---|---|---|
| 2012/0086877 A1* | 4/2012 | Kaoh | H04N 21/8153 |
| | | | 348/739 |
| 2012/0204208 A1* | 8/2012 | Ahn | G06Q 30/02 |
| | | | 725/32 |
| 2014/0337697 A1* | 11/2014 | Ryu | H04L 51/52 |
| | | | 709/204 |
| 2015/0070516 A1* | 3/2015 | Shoemake | H04N 21/4542 |
| | | | 348/207.11 |
| 2016/0140934 A1* | 5/2016 | Frieder | G11B 27/34 |
| | | | 345/156 |
| 2016/0255162 A1* | 9/2016 | Frieder | H04W 4/21 |
| | | | 709/204 |
| 2018/0113662 A1* | 4/2018 | Chun | G06F 16/5866 |
| 2018/0146447 A1* | 5/2018 | Frieder | H04W 64/00 |

* cited by examiner

ELECTRONIC DEVICE THAT PRESENTS MEDIA CONTENT ON DISPLAY BASED ON CONSUMER CONTEXT

BACKGROUND

1. Technical Field

The present disclosure relates generally to electronic devices having embedded sensors that support human identification, and more particularly to electronic devices that support presentation of media content and having embedded sensors that support human identification.

2. Description of the Related Art

User communication devices such as mobile phones, desktop workstations, laptops, and tablets are often equipped with a camera and a microphone to enable human interaction. Microphones and cameras can also be incorporated as peripheral devices. Initially intended to support voice and later video communication sessions, these sensors have been used for an increasing number of purposes. The user communication devices are connectable to a number of external devices that provide and/or can play audio and video media content. Given the ubiquity of user communication devices such as smart phones, consumers of media content find it convenient to use their communication device to select and present media content. However, the user still has to make a manual selection to present media content that is germane to those consumers who are experiencing the media content.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
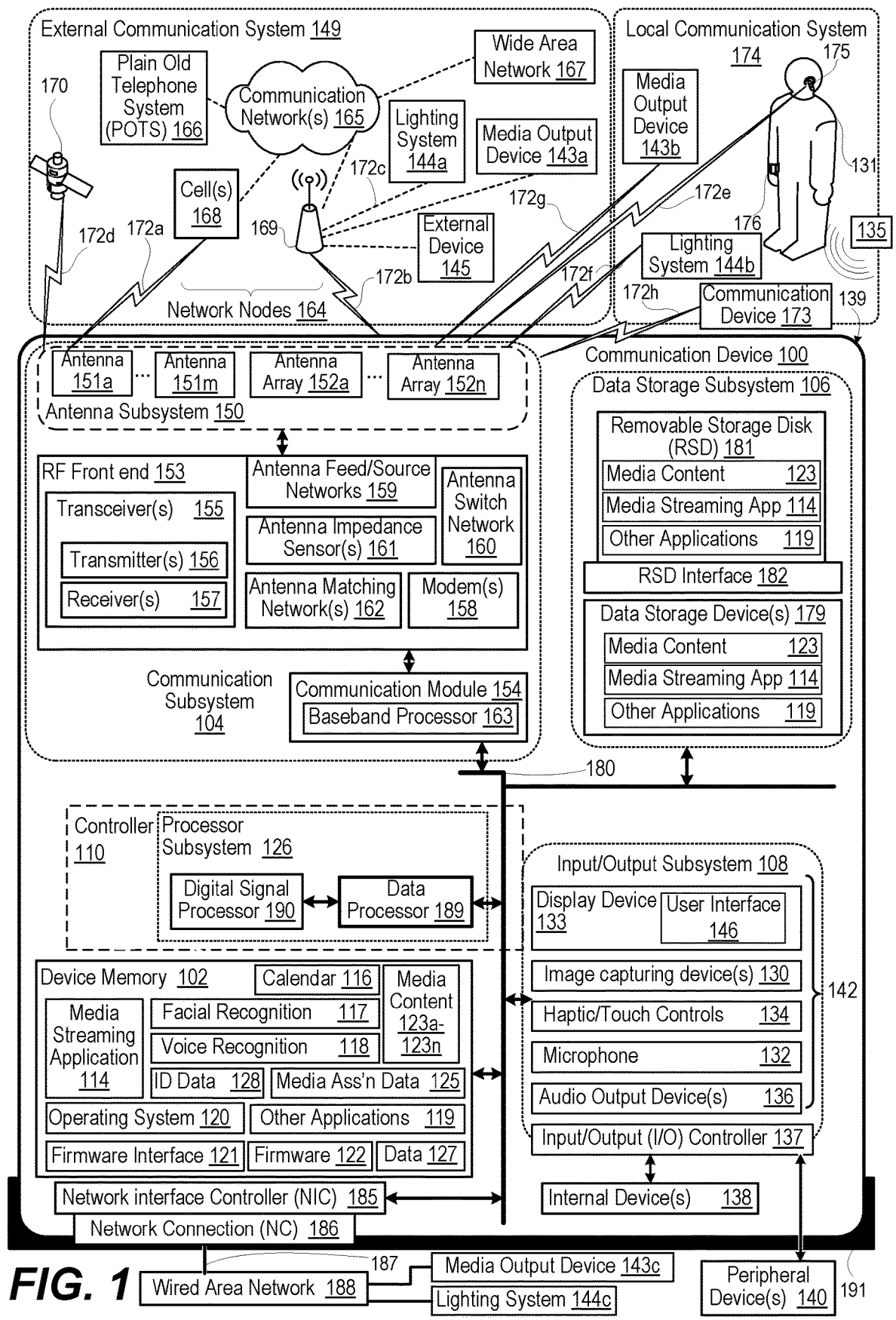
FIG. 1 depicts a functional block diagram of a communication environment of a communication device that manages autonomous selection and presentation of media content in response to identification of person(s) in or near a monitored area, and within which the features of the present disclosure are advantageously implemented, according to one or more embodiments.

According to aspects of the present disclosure, an electronic device, a computer program product, and a method enable autonomous selection and presentation of media content that is associated with a person identified as being present in or approaching/entering a monitored space. The electronic device includes a device interface that is communicatively coupled to a media output device that presents media content in the monitored area. A controller of the electronic device is communicatively coupled to one or more sensors and the media output device. Autonomously or in response to a user selection, the controller presents a default selection of media content on the media output device. As an example of an autonomous response, controller can present the default selection of media content as a displayed screen saver in response to being activated for a period of time without user selection of specific media content. The controller monitors the one or more sensors to detect a presence of a person within the monitored area or a time during which the person is expected to arrive at or be present in the monitored area. The controller identifies the person based on one or more inputs. The controller selects, from among a plurality of available media content, media content that is associated with the identified person. The controller presents the selected media content on the media output device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized.

Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts an operating environment having a functional block diagram of an electronic device, specifically communication device 100, within which several of the features of the present disclosure are advantageously implemented. Referring now to the specific component makeup and the associated functionality of communication device 100 of FIG. 1. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as media streaming application 114, calendar utility 116, facial recognition utility 117, voice recognition utility 118, and other application(s) 119. Device memory 102 further includes operating system (OS) 120, firmware interface 121, such as basic input/output system (BIOS) or Uniform Extensible Firmware Interface (UEFI), and firmware 122. Device memory 102 can include media content 123a-123n used by media streaming application 114.

Controller 110 includes processor subsystem 126 that executes program code to provide operating functionality of communication device 100. The software and/or firmware modules have varying functionality when their corresponding program code is executed by processor subsystem 126 or secondary processing devices within communication device 100. Processor subsystem 126 of controller 110 can execute program code of media streaming application 114 and other applications 119 to configure communication device 100 to perform specific functions. Device memory 102 can include data 127 used by the applications. As an example, applications such as facial or voice recognition utilities 117 and 118 can use identification (ID) data 128 for identifying a particular person.

I/O subsystem 108 includes user interface components such as image capturing device 130, microphone 132, display device 133, touch/haptic controls 134, and audio output device(s) 136. Microphone 132 can detect a voice of consumer 131 and an aural alarm from sound emitting device 135, such as a doorbell or household appliance. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to at least one image capturing device 130 and to at least one user interface device 142 that includes at least one microphone 132. Controller 110 manages autonomous selection and presentation of media content 123a-123n at media output device(s) 143a-143c. In particular, controller 110 selects from among media content 123a-123nc that is associated with identified person(s) 131 near media output device(s) 143a-143c or entering the space in which the specific media content 123a-123n can be consumed (i.e., viewed and/or listened to). In one or more embodiments, communication device 100 is communicatively coupled to media output device(s) 143a-143c using device interface 201 that can support one or more of: (i) wireless protocols 202; (ii) wired protocols 203; and (iii) radio access protocols 204 (FIG. 2) described below. In an example, device interface 201 (FIG. 2) supports wireless communication. In another example, the device interface is a wired connection to media output device(s) 143a-143c. Controller 110 can also be communicatively coupled to lighting system(s) 144a-144b to adjust lighting in support of presenting media content 123a-123n at media output device(s) 143a-143c. In one or more embodiments, controller 110 executes program code such as media streaming application 114 stored in a computer readable storage device such as device memory 102 to control selecting and presenting of media content 123a-123n at media output device(s) 143a-143c. Controller 110 initially presents a default selection of media content 123a on media output device(s) 143a-143c. Controller 110 determines, using one or more local sensors, such as at least one image capturing device 130 and at least one microphone 132, and/or one or more remote sensors of external devices 145, such as doorbell or video security system, that person 131 is in a monitored area or is about to be present within the monitored area during the presenting of the media content 123. Controller 110 further identifies person 131. Controller 110 selects, from among a plurality of available media content 123a-123n, selected media content 123b that is associated with identified person 131. Controller 110 presents selected media content 123b on media output device(s) 143a-143c.

Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 149. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulates baseband encoded data from communication module 154 onto a carrier signal to provide a transmit signal that is amplified by transmitter(s) 156. Modem(s) 158 demodulates each signal received by antenna subsystem 150 from external communication system 149. The received signal is amplified and filtered by receiver(s) 157, which demodulates received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceivers 155. Antenna matching network(s) 162 can also be used to detune the impedance of lower band antennas 151a-151m to not match the impedance of transceivers 155 to electromagnetically isolate a particular antenna.

In one or more embodiments, controller 110, via communication subsystem 104, performs multiple types of over-the-air (OTA) communication with network nodes 164 of external communication system 149. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 151a-151m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node 169. In one or more particular embodiments, access node 169 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 104 communicates with one or more locally networked devices via wired or wireless link 172c provided by access node 169. Examples of locally networked devices include media output device 143a, lighting system 144, and external devices 145. External devices 145 can include gate or door monitors, surveillance cameras, calendar systems, etc., that detect or predict the imminent arrival of another person and that communicate notifications to communication device 100. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with headset 175 or with smart watch 176. Communication subsystem 104 communicates via second low power wireless communication channel(s) 172g, such as Bluetooth, with media output device 143b. Communication subsystem 104 communicates via second low power wireless communication channel(s) 172f, such as Bluetooth, with lighting system 144b. Communication subsystem 104 communicates wireless communication channel(s) 172g with second communication device 173 as part of an ad hoc network. In one or more embodiments, second communication device 173 reports geospatial location to communication device 100 via some communication pathway supported by communication subsystem 104 enabling a prediction of arrival of an associated person at a monitored area.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as media streaming application 114 and other application(s) 119 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for media streaming application 114 and other applications 119. When executed by controller 110, the program code causes or configures communication device 100 to improve a user experience in participating in a video communication session described herein.

In one or more embodiments, I/O subsystem 108 includes network interface controller (NIC) 185 with a network connection (NC) 186 on housing 139. Network cable 187 connects NC 186 to wired area network 188. Wired area network 188 can be a local area network (LAN), a campus area network (CAN), a metropolitan area network (MAN), or a wide area network (WAN). For example, NC 186 can be an Ethernet connection. Media output device 143c and lighting system 145c are presented communicatively couple to wired area network 188. In an example, communication device 100 is positioned in dock 191. Dock 191 can provide for communication device 100 a charging power source and a communication connection to media output device 143c.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 126, which includes one or more central processing units (CPUs), depicted as data processor 189. Processor subsystem 126 can include one or more digital signal processors 190 that are integrated with data processor 189 or are communicatively coupled to data processor 189, such as baseband processor 163 of communication module 154. In one or more embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 180) are illustrated in FIG. 1, it is to be understood that more, fewer, or different interconnections may be present in other embodiments.

Figure 2:
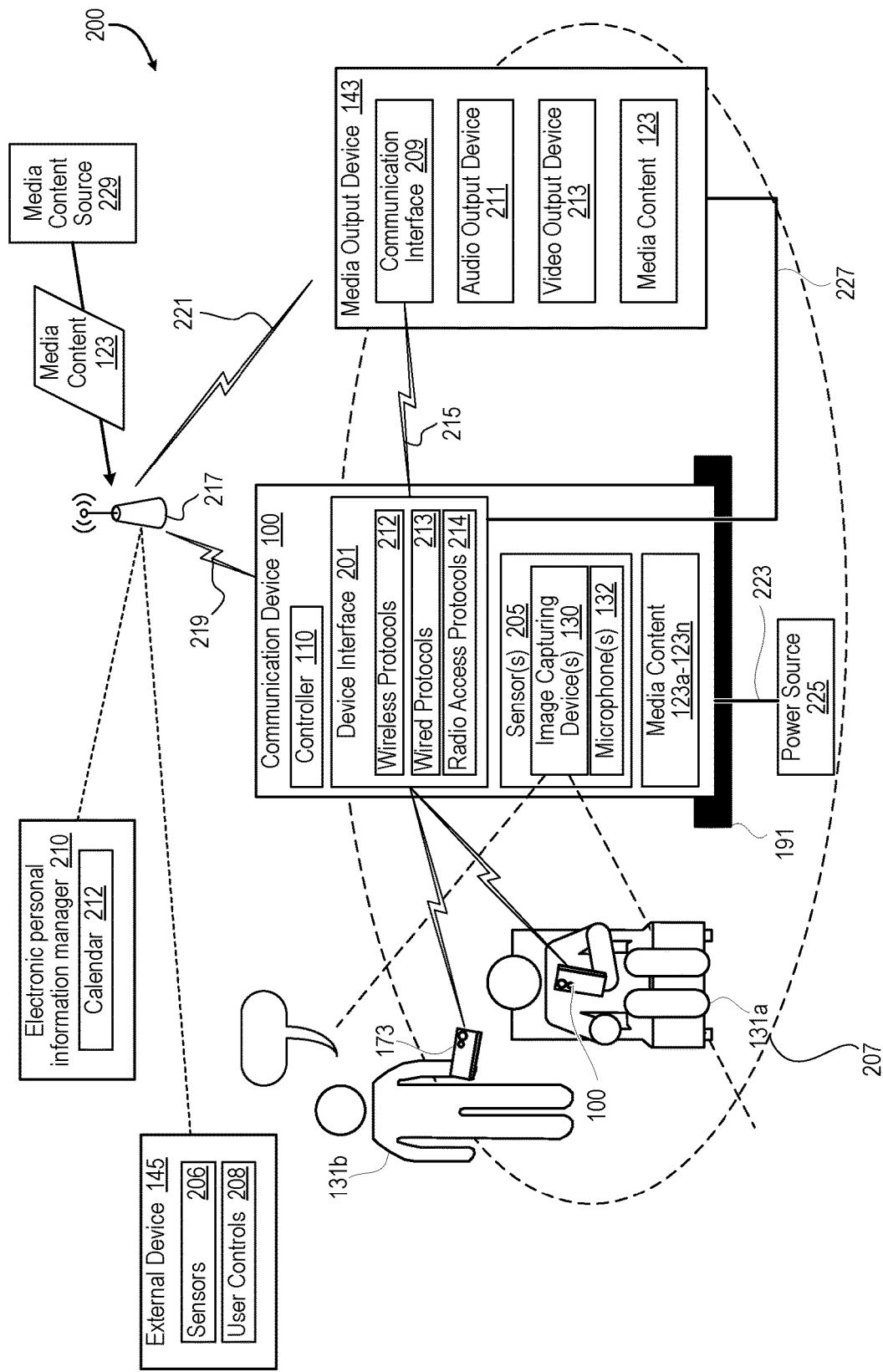
FIG. 2 depicts a communication system that includes the communication device of FIG. 1 communicatively connected to and controlling a media output device while using sensors to identify persons in a monitored area, according to one or more embodiments.

FIG. 2 depicts communication system 200 with communication device 100 communicatively connected to and controlling media output device 143 while using sensors 205 to identify persons 131a-131b in monitored area 207. External device 145 can have sensors 206 that detect person 131b prior to reaching monitored area 207. External device 145 can include user controls 208 that person 131b uses to gain access to monitored area 207. Examples of external device 145 include video surveillance systems or door/gate access systems. Communication device 173 carried by person 131b can report geospatial location to communication device 100, enabling communication device 100 to predict arrival of person 131b at monitored area 207.

Communication device 100 can select media content 123 in response to predicting arrival of person 131b. Electronic personal information manager 210 can include calendar 212 having events that indicate arrival of person 131b at a particular time. Person 131a is experiencing presentation of media content 123 at media output device 143. Person 131b is experiencing or is predicted to soon experience media content 123 at media output device 143. For clarity, two persons 131a-131b are depicted. However, aspects of the present innovation are applicable to one person and more than two people. In an example, controller 110 monitors image capturing device(s) 130 of sensor(s) 205 to visually identify each person 131a-131b using facial recognition capabilities. In another example, controller 110 monitors microphone(s) 132 of sensor(s) 205 to aurally identify persons 131a-131b using voice recognition capabilities. In an additional example, controller 110 monitors device interface 201 to aurally identify persons 131a-131b using for example device identifiers transmitted respectively by communication devices 100/173. Wireless or cellular transmissions from communication devices 100/173 can include a Federal Communication Commission (FCC) or mobile phone identifier that uniquely identifies communication devices 100/173. Examples of device identifiers includes international mobile equipment identity (IMEI), mobile equipment identifier (MEID), and android device identifier.

In one or more embodiments, communication device 100 is communicatively coupled by device interface 201 to communication interface 209 of media output device 143. In an example, media content 123 includes an audio portion that is presented by audio output device 211. In another example, media content 123 includes a visual portion (e.g., video, images) that is presented by video output device 213. Media content 123 can be read from storage media (e.g., optical disc, RSD, etc.) by media output device 143 or received at communication interface 209.

In an example, device interface 201 supports a direct wireless communication channel 215. As another example, device interface 201 wirelessly connects to access point 217 via wireless communication channel 219. Access point 217 is also wirelessly connected to communication interface 209 at media output device 143 via wireless communication channel 221. In an additional example, dock 191 provides power connection 223 to power source 225 and a wired communication connection 227 to media output device 143. Access point 217 can provide media content 123 received from network media source 229. Media content 123 can also be stored at communication device 100 or media output device 143.

In one or more embodiments, sensor(s) 205 can provide sufficient information for controller 110 to identify a person. As an example, controller 110 detects a face within the captured image from image capturing device(s) 130. Controller 110 compares identifying characteristics of the face to characteristics of stored faces of known persons to detect a match. As another example, to identify the person, controller 110 detects a voice within the captured audio inputs from microphone(s) 132. Controller 110 compares identifying characteristics of the voice to characteristics of stored voices of known persons to detect a match. In one or more embodiments, to identify the person, device interface 201 detects a device identifier transmitted by a communication device that is associated with the second person.

In one or more embodiments, sensor(s) 205 can detect that a person is present but the detected information is insufficient to identify person 131*b*, requiring a second input for collaboration. In an example, controller 110 identifies person 131*b* in part by determining that a calendar event scheduled for a current time includes person 131*b*. In one or more embodiments, the controller identifies person 131*b* in response to: (i) determining that a geospatial location is received from second communication device 173 that is approaching the monitored area; and (ii) associating the second communication device with second person 131*b*.

Figure 3:
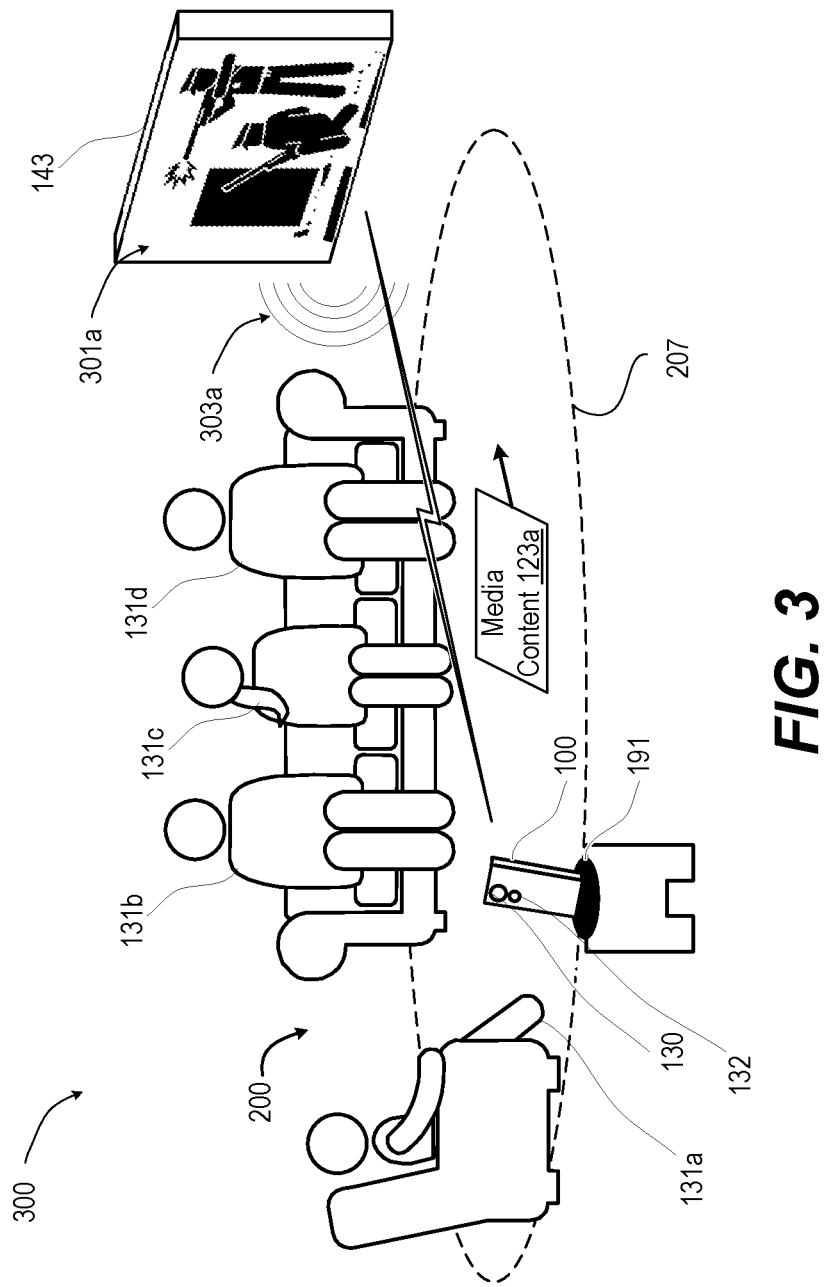
FIG. 3 depicts a viewing environment with the communication system of FIG. 2 including the communication device and media output device that respectively select and present media content, according to one or more embodiments.

FIG. 3 depicts a viewing environment 300 during selecting of media content 123*a* by communication device 100 that is presented by media output device 143. Media content 123*a* can be automatically selected by communication device 100 or manually selected by one of persons 131-131*d*. Persons 131-131*d* are in monitored area 207 and are experiencing presentation of visual portion 301*a* and aural portion 303*a* of media content 123*a* at media output device 143. Communication device 100 is positioned in dock 191 to orient image capturing device(s) 130 and microphone(s) 132 to detect persons 131-131*d* in monitored area 207.

Figure 4:
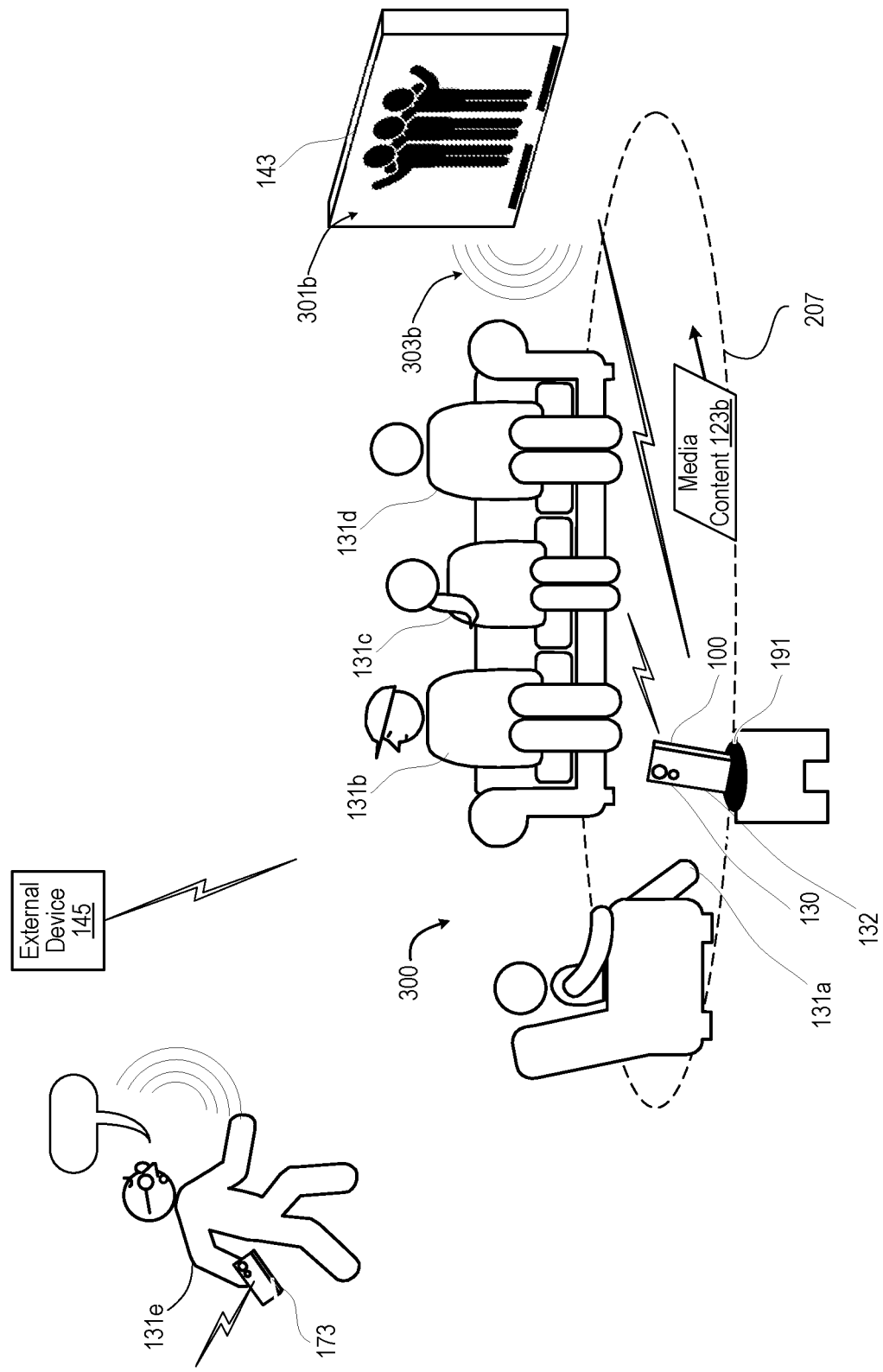
FIG. 4 depicts the viewing environment of FIG. 3 during selecting of different media content by the communication device in response to identifying a new person entering the monitored area, according to one or more embodiments.

FIG. 4 depicts the viewing environment 300 during autonomous selecting of different media content 123*b* by communication device 100 in response to identifying person 131*e* entering, or predicted to enter, monitored area 207. Location of person 131*e* can be detected by communication device 100 or external device 145. Communication device 173 carried by person 131*e* can report geospatial location to communication device 100. Communication device 100 can have scheduling information that predicts arrival of person 131*e*. External device 145 or communication device 100 can identify a transmission by communication device 173 carried by person 131*e* that indicates proximity of person 131*e*. In one embodiment, media content 123*a* (FIG. 3) is offensive or age inappropriate to person 131*e*, whereas media content 123*b* is acceptable to person 131*e*. In another embodiment, media content 123*a* (FIG. 3) is not associated with and does not include person 131*e*, whereas media content 123*b* is associated with person 131*e*. For example, communication device 100 can have access to media content 123 can comprise digital photographs or videos collected by person 131*a*. As an example, communication device 100 can have access to digital photographs or videos captured by communication device 100. As another example, communication device 100 can access social media sites where digital photographs are posted. Communication device 100 can associate particular digital photographs with specific people based on reading metadata or tags linked to the particular digital photographs. Communication device 100 can perform facial recognition, matching faces in particular digital photographs or video to faces detected by communication device 100 or reported to communication device 100 by external devices 145.

Figure 5:
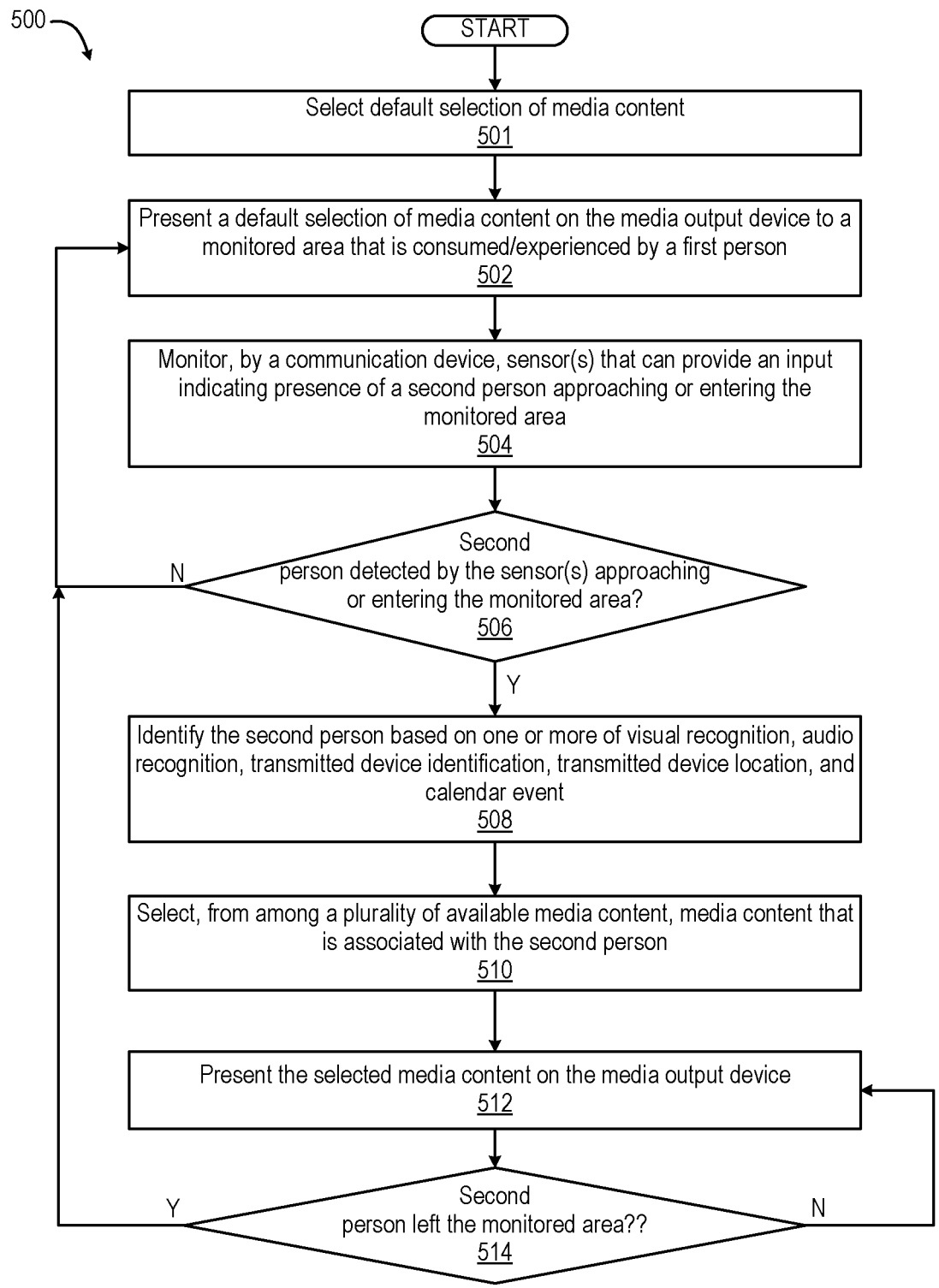
FIG. 5 presents a flow diagram of a method for autonomous selection and presentation of media content in response to identification of person(s) in or near a monitored area, according to one or more embodiments.

FIG. 5 presents a flow diagram of method 500 for autonomous selection and presentation of media content in response to identification of a person(s) in or approaching a monitored area. In particular, method 500 manages control of media output device 106 by an electronic device such as communication device 100 (FIG. 1). In at least one embodiment, communication device 100, managed by controller 110, executes media streaming application 114 (FIG. 1) to manage selection of specific media content 123*a*-123*n* based on person identification by controller 110 (FIG. 1). The description of method 500 is provided with general reference to the specific components illustrated within the preceding FIGS. 1-4, and specific components referenced in methods 500 can be identical or similar to components of the same name used in describing preceding FIGS. 1-4.

Method 500 includes selecting a default selection of media content (block 501). In one or more embodiments, method 500 includes selecting, from among the plurality of available media content, a first subset of photographs that can be random photographs and which are not specifically associated with the person, as the default media content. In one or more embodiments, method 500 includes selecting, from among the plurality of available media content, default media content that is not filtered based on the presence of a specific person. In an example, the media content that is not filtered may include content that is not appropriate for young people or would be offensive to people of certain dispositions or backgrounds.

Method 500 includes presenting a default selection of media content in the monitored area via the media output device that is consumed/experienced by a first person (block 502). In one or more embodiments, method 500 includes sequentially presenting the first subset of photographs, as the default selection. The first subset of photographs can be presented on the media output device as a screensaver background.

The default media content can include visual and/or audio portions. In one or more embodiments, the default selection of media content is manually selected by the first person using a user interface presented by either the communication device or the at least one media output device. In one or more embodiments, the communication device autonomously selects the default selection in response to associating the default selection of media content with the first person. Method 500 includes monitoring, by a communication device, sensor(s) that can provide an input indicating a presence of a second person approaching or entering the monitored area (block 504). In one or more embodiments, the communication device includes the sensor(s). In one or more embodiments, an external device such as positioned at an access path to the monitored area includes the sensor(s).), are (e.g., image capturing device, microphone, receiver) that are in the communication device for an input indicative of presence of and/or an external device (e.g., door/gate access control, surveillance device, communication system). Method 500 includes determining whether a second person is detected by the sensor(s) approaching or entering the monitored area (decision block 506). In response to determining that a second person is not detected by the sensor(s) approaching or entering the monitored area, method 500 returns to block 502. In response to determining that a second person is detected by the sensor(s) approaching or entering the monitored area, method 500 includes identifying the second person based on one or more of visual recognition, audio recognition, transmitted device identification, transmitted device location, and calendar event (block 508).

Method 500 includes selecting, from among a plurality of available media content, media content that is associated with the second person (block 510). In one or more embodiments, the selection can be made for the purpose of honoring a visitor with personalized content associated with the second person. In one or more embodiments, the selection is made to avoid offending the second person or embarrassing the first person. In one or more embodiments, the selection is made specifically for the person with the highest priority or rank. In one or more embodiments, the selection is made to appeal to all or most of the people in the monitored area. In one or more embodiments, method 500 includes selecting, from among the plurality of available media content, next media content comprising a second subset of photographs that are associated with the person. In one or more embodiments, method 500 includes selecting, from among the plurality of available media content, specific media content that is associated with the person and/or which is filtered to include content that is appropriate and non-objectionable for consumption by the person.

Method 500 includes presenting the selected media content on the media output device (block 512). In one or more embodiments, method 500 includes presenting the second subset of photographs on the media output device as the screensaver background. Method 500 includes determining whether the second person has left the monitored area (decision block 514). In response to determining that the second person has left the monitored area, method 500 returns to block 502. In response to determining that the second person has not left the monitored area, method 500 returns to block 512.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a device interface that is communicatively coupled to a media output device that presents media content in a monitored area;
   a controller communicatively coupled to one or more sensors and the media output device, and which:
      presents a default selection of media content on the media output device to a monitored area, the media content comprising a first subset of photographs not specifically associated with a person;
      monitors the one or more sensors to detect a presence of the person within or approaching the monitored area; and
      in response to detecting the presence of the person:
         selects, from among a plurality of available media content, next media content that is specifically associated with the identified person, the next media content comprising a second subset of photographs associated with the person; and
         presents the selected next media content of the second subset of photographs on the media output device, wherein the controller presents the second subset of photographs on the media output device as a screensaver background.

2. The electronic device of claim 1, wherein:
   the one or more sensors comprise at least one image capturing device that captures images; and
   to identify the person, the controller detects a face within the captured image and compares identifying characteristics of the face to characteristics of stored faces of known persons to detect a match.

3. The electronic device of claim 1, further comprising an over-the-air (OTA) communication subsystem that is communicatively coupled to the controller and that detects communication devices, wherein the controller:

receives a geospatial location from a communication device; and identifies the person in response to determining that the geospatial location is approaching the monitored area by associating the person with the communication device.

4. The electronic device of claim 1, wherein the controller identifies the person by determining that a calendar event scheduled for a current time includes the person.

5. The electronic device of claim 1, wherein:

the one or more sensors comprise at least one microphone that captures audio inputs of voices; and to identify the person, the controller detects a voice within the captured audio inputs and compares identifying characteristics of the voice to characteristics of stored voices of known persons to detect a match.

6. The electronic device of claim 1, further comprising an over-the-air (OTA) communication subsystem that is communicatively coupled to the controller and that detects communication devices, wherein the controller:

detects a device identifier for a communication device; and to identify the person, compares the device identifier with stored device identifiers associated with known persons to detect a match.

7. The electronic device of claim 1, further comprising an over-the-air (OTA) communication subsystem that is communicatively coupled to the controller and that detects device identifiers respectively of communication devices within the monitored area, wherein:

the one or more sensors comprise: (i) at least one image capturing device that captures images; and (ii) at least one microphone that captures audio inputs of voices; and the controller identifies the person based on at least two of: (i) a device identifier; (ii) an image; and (iii) an audio input, wherein:

to identify the person using the device identifier, the controller compares the device identifier with stored device identifiers associated with known persons to detect a match;

to identify the person using the image, the controller detects a face within the captured image and compares identifying characteristics of the face to characteristics of stored faces of known persons to detect a match; and to identify the person using the audio input, the controller detects a voice within the captured audio inputs and compares identifying characteristics of the voice to characteristics of stored voices of known persons to detect a match.

8. The electronic device of claim 1, wherein the controller:

selects, from among the plurality of available media content, the first subset of photographs not specifically associated with the person, as the default media content;

sequentially presents the first subset of photographs on the media output device as a screensaver background; and in response to identifying the person being in or approaching the monitored area:

selects, from among the plurality of available media content, the next media content comprising the second subset of photographs associated with the person.

9. The electronic device of claim 1, wherein the controller:

selects, from among the plurality of available media content, media content that is not filtered based on the presence of a specific person;

presents the media content on the media output device; and in response to identifying the person being in or approaching the monitored area, selects, from among the plurality of available media content, the media content associated with the person filtered to include content that is appropriate and non-objectionable for consumption by the person.

10. The electronic device of claim 1, wherein the controller:

identifies the person and at least one second person based on one or more inputs;

selects, from among the plurality of available media content, second media content that is associated with both the person and the at least one second person; and presents the second media content on the media output device.

11. The electronic device of claim 1, wherein the controller:

identifies the person and at least one second person based on one or more inputs;

determines which particular person from among the person and the at least one second person has priority;

selects, from among the plurality of available media content, second media content that is associated with the particular person; and presents the second media content on the media output device.

12. The electronic device of claim 1, wherein the controller presents the default selection of media content on the media output device in response to determining that the identified person has left the monitored area.

13. A method comprising:

presenting a default selection of media content on a media output device that presents the media content in a monitored area, the media content comprising a first subset of photographs not specifically associated with a person;

monitoring, by an electronic device, one or more sensors to detect a presence of the person within the monitored area; and in response to detecting the presence of the person:

selecting, from among a plurality of available media content, next media content that is specifically associated with the identified person, the next media content comprising a second subset of photographs associated with the person; and presenting the selected next media content of the second subset of photographs on the media output device, the presenting comprising presenting the second subset of photographs on the media output device as a screensaver background.

14. The method of claim 13, further comprising:

identifying the person based on at least one of: (i) a device identifier; (ii) an image; and (iii) an audio input, wherein:

identifying the person using the device identifier comprises comparing the device identifier with stored device identifiers associated with known persons to detect a match;

identifying the person using the image comprises detecting a face within the captured image and comparing identifying characteristics of the face to characteristics of stored faces of known persons to detect a match; and identifying the person using the audio input comprises detecting a voice within the captured audio inputs and comparing identifying characteristics of the voice to characteristics of stored voices of known persons to detect a match.

15. The method of claim 13, further comprising:

selecting, from among the plurality of available media content, the first subset of photographs not specifically associated with the person, as the default media content;

sequentially presenting the first subset of photographs on the media output device as a screensaver background; and in response to identifying the person entering or being in the monitored area:
  selecting, from among the plurality of available media content, the next media content comprising the second subset of photographs associated with the person.

16. The method of claim 13, further comprising:

selecting, from among the plurality of available media content, media content that is not filtered based on the presence of a specific person;

presenting the media content on the media output device; and in response to identifying the person entering the monitored area, selecting, from among the plurality of available media content, the media content associated with the person filtered to include content that is appropriate and non-objectionable for consumption by the person.

17. The method of claim 13, further comprising:

identifying the person and at least one second person based on the one or more inputs;

selecting, from among the plurality of available media content, second media content that is associated with both the person and the at least one second person; and presenting the second media content on the media output device.

18. The method of claim 13, further comprising:

identifying the person and at least one second person based on the one or more inputs;

determining which particular person from among the person and the at least one second person has priority;

selecting, from among the plurality of available media content, second media content that is associated with the particular person; and presenting the second media content on the media output device.

19. A computer program product comprising:

a computer readable storage device; and program code on the computer readable storage device that when executed by a processor associated with an electronic device, the program code enables the electronic device to provide functionality of:

presenting a default selection of media content on a media output device that presents the media content in a monitored area, the media content comprising a first subset of photographs not specifically associated with a person;

monitoring one or more sensors to detect a presence of the person within the monitored area; and in response to detecting the presence of the person:
    selecting, from among a plurality of available media content, next media content that is specifically associated with the identified person, the next media content comprising a second subset of photographs associated with the person; and
    presenting the selected next media content of the second subset of photographs on the media output device by presenting the second subset of photographs on the media output device as a screensaver background.

20. The computer program product of claim 19, wherein the program code enables the electronic device to provide the functionality of:

identifying the person based on at least one of: (i) a device identifier; (ii) an image; and (iii) an audio input, wherein:

identifying the person using the device identifier comprises comparing the device identifier with stored device identifiers associated with known persons to detect a match;

identifying the person using the image comprises detecting a face within the captured image and comparing identifying characteristics of the face to characteristics of stored faces of known persons to detect a match; and identifying the person using the audio input comprises detecting a voice within the captured audio inputs and comparing identifying characteristics of the voice to characteristics of stored voices of known persons to detect a match.

* * * * *

UNITED STATES PATENT AND TRADEMARK OFFICE
CERTIFICATE OF CORRECTION

| | | |
|---|---|---|
| PATENT NO. | : 11,564,007 B1 | |
| APPLICATION NO. | : 17/410332 | |
| DATED | : January 24, 2023 | |
| INVENTOR(S) | : Amit Kumar Agrawal, Mayank Gupta and Nadeem Nazarali Panjwani | |

It is certified that error appears in the above-identified patent and that said Letters Patent is hereby corrected as shown below:

On the Title Page

Column 1 Line 3 (72) Inventors:
Nadeen Nazarali Panjwani
Should read:
Nadeem Nazarali Panjwani Signed and Sealed this
Third Day of September, 2024

Katherine Kelly Vidal
*Director of the United States Patent and Trademark Office*